United States Patent
Schmitt et al.

(10) Patent No.: US 11,699,828 B2
(45) Date of Patent: Jul. 11, 2023

(54) BATTERY INCLUDING TENSIONING BAND BONDED TO SIDE WALLS OF BATTERY CELLS BY BAND BONDING MATERIAL

(71) Applicant: Robert Bosch GmbH, Stuttgart (DE)

(72) Inventors: Markus Schmitt, Tamm (DE); Ionut Marian Lica, Schwieberdingen (DE); Martin Kassner, Weil der Stadt (DE); Roman Marx, Moensheim (DE)

(73) Assignee: Robert Bosch GmbH, Stuttgart (DE)

( * ) Notice: Subject to any disclaimer, the term of this patent is extended or adjusted under 35 U.S.C. 154(b) by 173 days.

(21) Appl. No.: 17/163,689

(22) Filed: Feb. 1, 2021

(65) Prior Publication Data

US 2021/0242527 A1  Aug. 5, 2021

(30) Foreign Application Priority Data

Jan. 30, 2020 (DE) ............... 10 2020 201 139.7

(51) Int. Cl.
*H01M 50/293* (2021.01)
*H01M 10/04* (2006.01)
(Continued)

(52) U.S. Cl.
CPC ..... *H01M 50/293* (2021.01); *H01M 10/0481* (2013.01); *H01M 10/0525* (2013.01); *H01M 50/209* (2021.01)

(58) Field of Classification Search
CPC ............. H01M 50/293; H01M 50/209; H01M 10/0481; H01M 10/0525
(Continued)

(56) References Cited

U.S. PATENT DOCUMENTS

| 2011/0151308 | A1 | 6/2011 | Yoon | |
| 2013/0004822 | A1* | 1/2013 | Hashimoto | H01M 10/6556 429/120 |
| 2013/0183571 | A1* | 7/2013 | Miyazaki | H01M 10/613 429/156 |

FOREIGN PATENT DOCUMENTS

| DE | 102014218330 A1 | 3/2016 |
| DE | 102017221769 A1 | 6/2019 |

(Continued)

OTHER PUBLICATIONS

"Align." In New Oxford American Dictionary, edited by Stevenson, Angus, and Christine A. Lindberg. : Oxford University Press, 2010. https://www.oxfordreference.com/view/10.1093/acref/9780195392883. 001.0001/m_en_us1220938. (Year: 2010).*

*Primary Examiner* — Sean P Cullen
(74) *Attorney, Agent, or Firm* — Michael Best & Friedrich LLP

(57) ABSTRACT

A battery (100), in particular a lithium-ion battery, having: a plurality of battery cells (10), which are assembled to form a cell stack and are received in a housing (20), wherein the battery cells (10) are bonded to the base (21) of the cell housing (20) by a heat conductive bonding material (TIM), a plurality of spacer elements (11), wherein a spacer element (11) of the plurality of spacer elements (11) is arranged in each case between two adjacent battery cells (10) of the plurality of battery cells (10), two end plates (22), which delimit the cell stack at the ends, wherein the end plates (22) are connected by at least one tensioning band (23), wherein the at least one tensioning band (23) at least partially surrounds the cell stack circumferentially. To this end, it is provided according to the invention that the at least one tensioning band (23) is bonded to the side walls of the battery cell (10) by a band bonding material.

16 Claims, 5 Drawing Sheets

(51) Int. Cl.
*H01M 50/209* (2021.01)
*H01M 10/0525* (2010.01)

(58) Field of Classification Search
USPC .......................................... 429/120, 156, 159
See application file for complete search history.

(56) References Cited

FOREIGN PATENT DOCUMENTS

| | | | |
|---|---|---|---|
| EP | 2341569 A1 | 7/2011 | |
| JP | 2008277085 A * | 11/2008 | |
| JP | 2008277085 A | 11/2008 | |
| WO | WO-2012165493 A1 * | 12/2012 | ............... B60K 1/04 |

* cited by examiner

BATTERY INCLUDING TENSIONING BAND BONDED TO SIDE WALLS OF BATTERY CELLS BY BAND BONDING MATERIAL

BACKGROUND OF THE INVENTION

The invention relates to a battery, in particular a lithium-ion battery, according to the precharacterizing clause of the independent device claim.

In modularly constructed batteries, individual battery cells are interconnected to form a cell stack which is received in a housing. Li-ion or Li-polymer battery cells heat up as a result of chemical conversion processes. This often occurs with rapid energy release or absorption. The more powerful the batteries, the more they heat up. The thermal management system must be correspondingly efficient. In addition to efficiently cooling the battery cells to favorable operating temperatures, it is necessary to heat up the battery cells at temperatures below 10° C. since they may only be charged to a limited extent at these temperatures.

In today's batteries, the cooling of battery cells predominantly occurs via liquid temperature control, for example with a water/glycol mixture. The cooling liquid is conducted through channels of the cooling element arranged below the cell stack. The cooling element is usually realized with the aid of hoses in a cooling circuit with further corresponding components.

According to the prior art, when cooling battery cells, a thermal interface material (TIM), for example in the form of a heat conductive paste, is used at the cell base to establish thermal contact with the cooling element. There are two options here. On the one hand, a gap pad or a gap filler can be used to establish thermal contact, wherein the mechanical fixing of the cells does not take place with the aid of the thermal interface material here and additional elements are required for the mechanical load transfer. On the other hand, a heat conductive bonding material can be used to establish thermal contact, which bonding material is additionally responsible for the mechanical fixing of the cell stack in the cell housing. In this case, the bonding material is fully responsible for the function of the mechanical load transfer. The cell stack is bonded in the cell housing at its base.

The cell stack is usually constructed such that a spacer element is located in each case between two adjacent battery cells, which spacer element prevents a battery cell from directly contacting another battery cell and sets a defined spacing between the battery cells. The cell stack is initially pre-compressed by end plates and tensioning bands. When the battery cells expand during operation, the bonding material has to be able to transfer the forces in the longitudinal direction of the cell stack. These forces become greater from the "begin of life" (BoL) to the "end of life (EoL), whereby the stresses in the bonding material increase significantly, especially at the first and last battery cell. In this case, there is the risk that the stresses in the bonding material towards the "end of life" will become so great that the bond breaks down mechanically and the cooling of the battery cells is therefore also no longer ensured.

SUMMARY OF THE INVENTION

The invention provides a battery, in particular a lithium-ion battery, having: a plurality of battery cells, which are assembled to form a cell stack and are received in a housing, wherein the battery cells are bonded to the base of the cell housing by a heat conductive bonding material, a plurality of spacer elements, wherein a spacer element of the plurality of spacer elements is arranged in each case between two adjacent battery cells of the plurality of battery cells, two end plates, which delimit the cell stack at the ends, wherein the end plates are connected, and in particular braced, by at least one tensioning band, wherein the at least one tensioning band at least partially surrounds the cell stack circumferentially. To this end, it is provided according to the invention that the at least one tensioning band is bonded to the side walls of the battery cells by a band bonding material.

For the bonding at the side walls of the battery cells, the bonding material can be applied either to the side walls of the battery cells or to the at least one tensioning band.

Within the scope of the invention, it is conceivable that at least one tensioning band in each case is bonded to the side walls of the battery cells on each longitudinal side of the cell stack. In this case, the ends of the tensioning bands can be attached to the end plates with material fit, for example by welding. Furthermore, form fitting and/or force fitting connections or a combination of material fitting and form fitting and/or force fitting connections are also conceivable. However, it is, at the same time, also conceivable that a continuous tensioning band can surround the cell stack over the full circumference and/or in the manner of a loop. In this case, the ends of the tensioning band can be attached to one another with material fit, for example by welding. A form fitting and/or force fitting connection or the combination of a material fitting and form fitting and/or force fitting connection is also conceivable here. The battery cells can therefore be braced in an even manner between the end plates.

In this case, the idea according to the invention consists in that the battery cells are bonded to the at least one tensioning band in addition to the bonding at the base of the cell housing. A second load path for transferring the expansion forces is thus provided. The stress in the heat conductive bonding material in the first load path thus decreases significantly and the risk of a breakdown of the heat conductive bonding material is minimized. The useful life of the heat conductive bonding material is increased considerably with the aid of the invention. In this case, the risk of the battery cells no longer being cooled due to a breakdown of the heat conductive bonding material can be minimized, thereby achieving a safety advantage. Since the stresses in the heat conductive bonding material between the battery cells and the base of the cell housing are reduced, the properties of the bonding material—strength to elongation at break—can be set within a greater range. A heat conductive bonding material with lower strength values and better heat conductivity can possibly be used since these two properties are dependent on one another.

In the case of a battery, the invention can further provide that the bonding material on the tensioning band has heat conductive additives. In this way, a second pathway for transferring the heat can be provided over at least one tensioning band. However, within the scope of the invention, it is essentially conceivable that the bonding material can be realized with or without heat conductive additives.

In the case of a battery, the invention can furthermore provide that the bonding material is realized as the same heat conductive bonding material with which the battery cells are bonded to the base of the cell housing. This can lead to cost-related advantages as well as advantages in terms of the manufacture, since there is no need to involve two different bonding materials.

In the case of a battery, the invention can furthermore provide that the bonding material between the at least one tensioning band and the side walls of the battery cells has a layer thickness which is set to be greater than the maximum permissible particle size for a residual dirt requirement in the battery. The minimum layer thickness of the bonding material is therefore matched to the maximum permissible particle size of the residual dirt requirement in order to ensure the electrical insulation between the battery cells and the at least one tensioning band in the event that particulate arises.

In the case of a battery, the invention can moreover provide that the at least one tensioning band has an electrically insulating coating. In this case, the tensioning band can be provided with the electrical insulating coating at least on the broad sides, but preferably over the full circumference. The electrically insulating coating can be provided, for example, by means of cathodic dip coating (CDC) or anodic dip coating (ADC), in an anodizing process, as an insulation foil etc.

Within the scope of the invention, the at least one tensioning band can be connected to the end plates with material fit. High forces can thus be transferred between the tensioning band and the end plates. The at least one tensioning band can preferably be welded to the end plates. Furthermore, form fitting connections or a combination of material fitting and form fitting and/or force fitting connections are furthermore also conceivable.

In the case of a battery, the invention can moreover provide that, in the region of a connection to the end plates, the at least one tensioning band has (in each case) a slot which extends in the width direction of the at least one tensioning band and whereof the ends are spaced from the side edges of the at least one tensioning band. In other words, the slot is not continuous, but ends from the end sides of the at least one tensioning band. As a result of the expansion of the battery cells, the end plates are bent outwards. As a result of the material fitting connection to the tensioning bands, this bending can bring about a peel strain on the bonding material in the case of the outer two battery cells. This strain can lead to high stresses in the bonding material. As a result of the slots, the load transfer is able to take place via the webs above and below these slots, which is sufficient due to the height and/or the material thickness of the webs being configured accordingly for this. The peel strain on the bonding material can be significantly reduced with the aid of slots, which ensures the reliability of the bonded connection.

It is moreover conceivable that the slot or the slots can have rounded portions at the ends. The mechanical stresses in the tensioning bands at the slots can be disseminated, and therefore evened out, by the rounded portions at both ends.

In the case of a battery, the invention can furthermore provide that the at least one tensioning band and/or the end plates is/are made from a metal material, in particular steel, high-grade steel or an aluminum alloy. Steel, in particular stainless steel, has a high tensile strength, a high elongation at break, and a high elastic modulus in order to be able to reliably transfer the mechanical forces and the cell expansion forces. It is also conceivable to construct the end plates and/or the at least one tensioning band from an aluminum alloy, since aluminum alloys also have moderate values in terms of their tensile strength, elongation at break and elastic modulus.

The invention furthermore provides a method for producing a battery, in particular a lithium-ion battery, having the following steps: providing a plurality of battery cells, which are assembled to form a cell stack and are received in a housing, wherein the battery cells are bonded to the base of the cell housing by a heat conductive bonding material, providing a plurality of spacer elements, wherein a spacer element of the plurality of spacer elements is arranged in each case between two adjacent battery cells of the plurality of battery cells, providing two end plates, which delimit the cell stack at the ends, wherein the end plates are connected by at least one tensioning band, wherein the at least one tensioning band at least partially surrounds the cell stack circumferentially, wherein the at least one tensioning band is bonded to the side walls of the battery cells by a bonding material. With the aid of the method according to the invention, the advantages achieved are the same as those described above in conjunction with the battery according to the invention. Full reference is made to these advantages here.

BRIEF DESCRIPTION OF THE DRAWINGS

The invention is furthermore illustrated in more detail with reference to the figures. In this case, it should be noted that the figures are only descriptive in nature and are not intended to restrict the invention in any form.

DETAILED DESCRIPTION

In the different figures, the same parts are always denoted by the same reference signs, and are therefore generally only described once.

Figure 1:
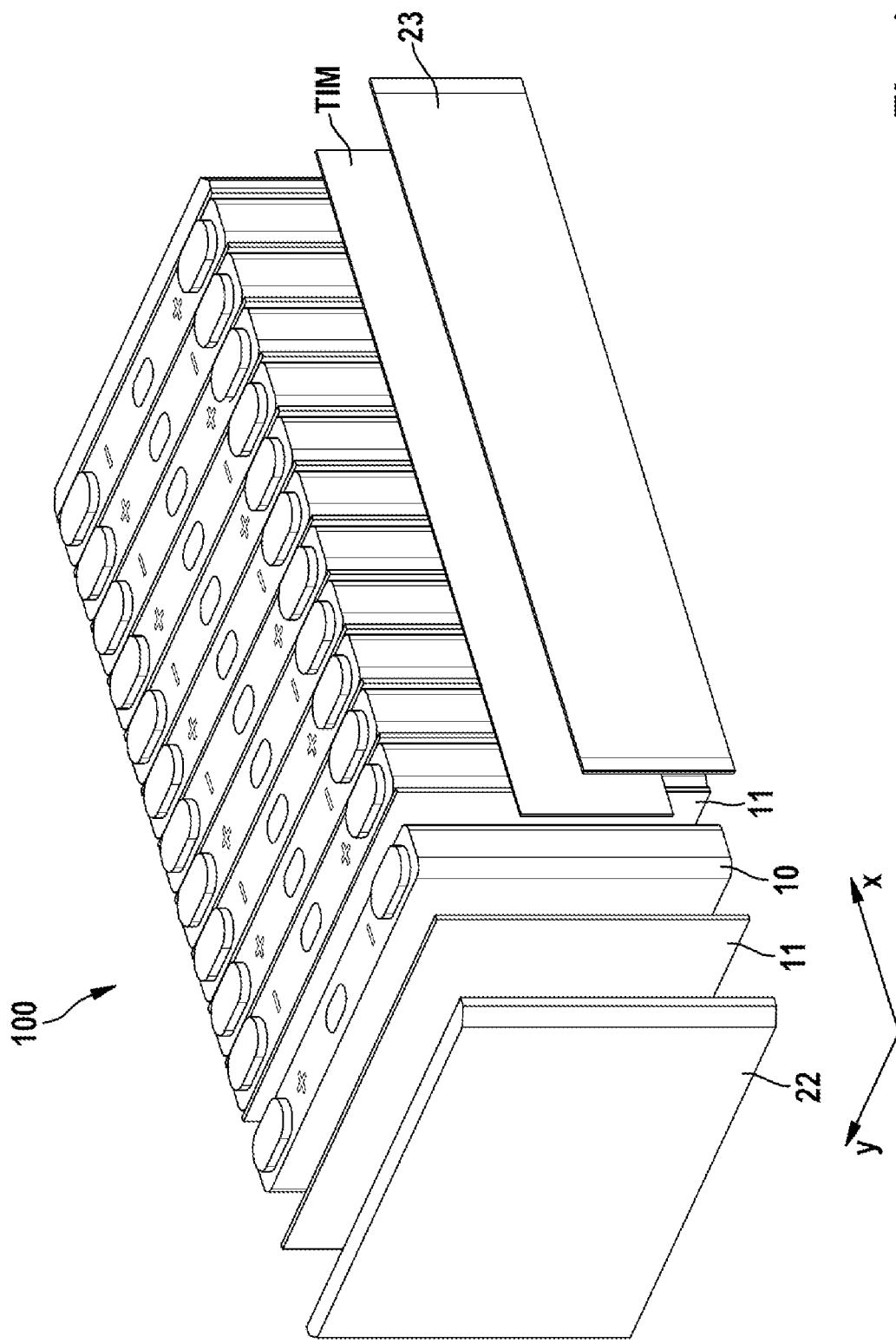
FIG. 1 shows an exemplary illustration of battery cells within the scope of the invention, which are assembled to form a stack.
Figure 2:
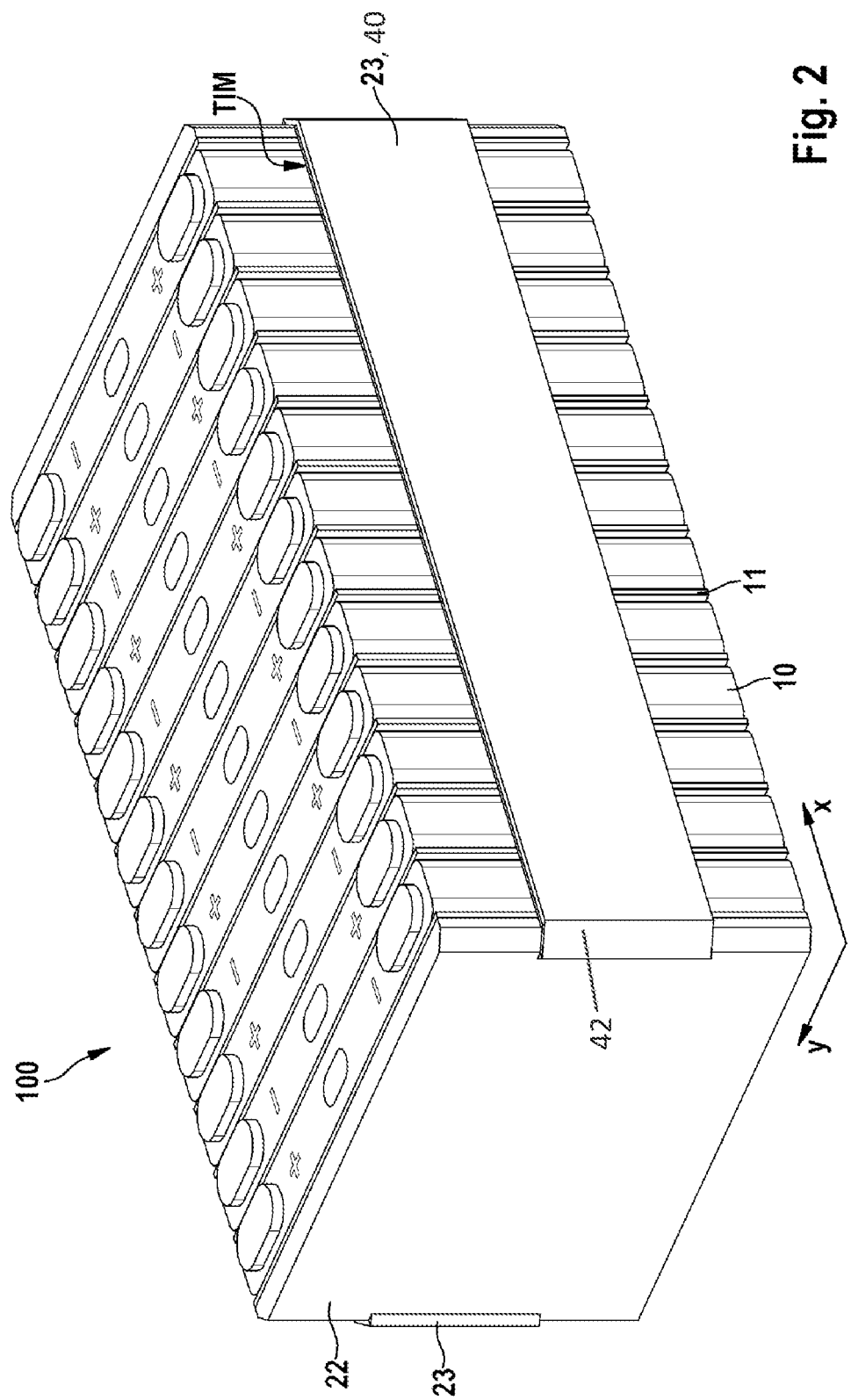
FIG. 2 shows an exemplary illustration of battery cells within the scope of the invention, which are assembled to form a stack.
Figure 3:
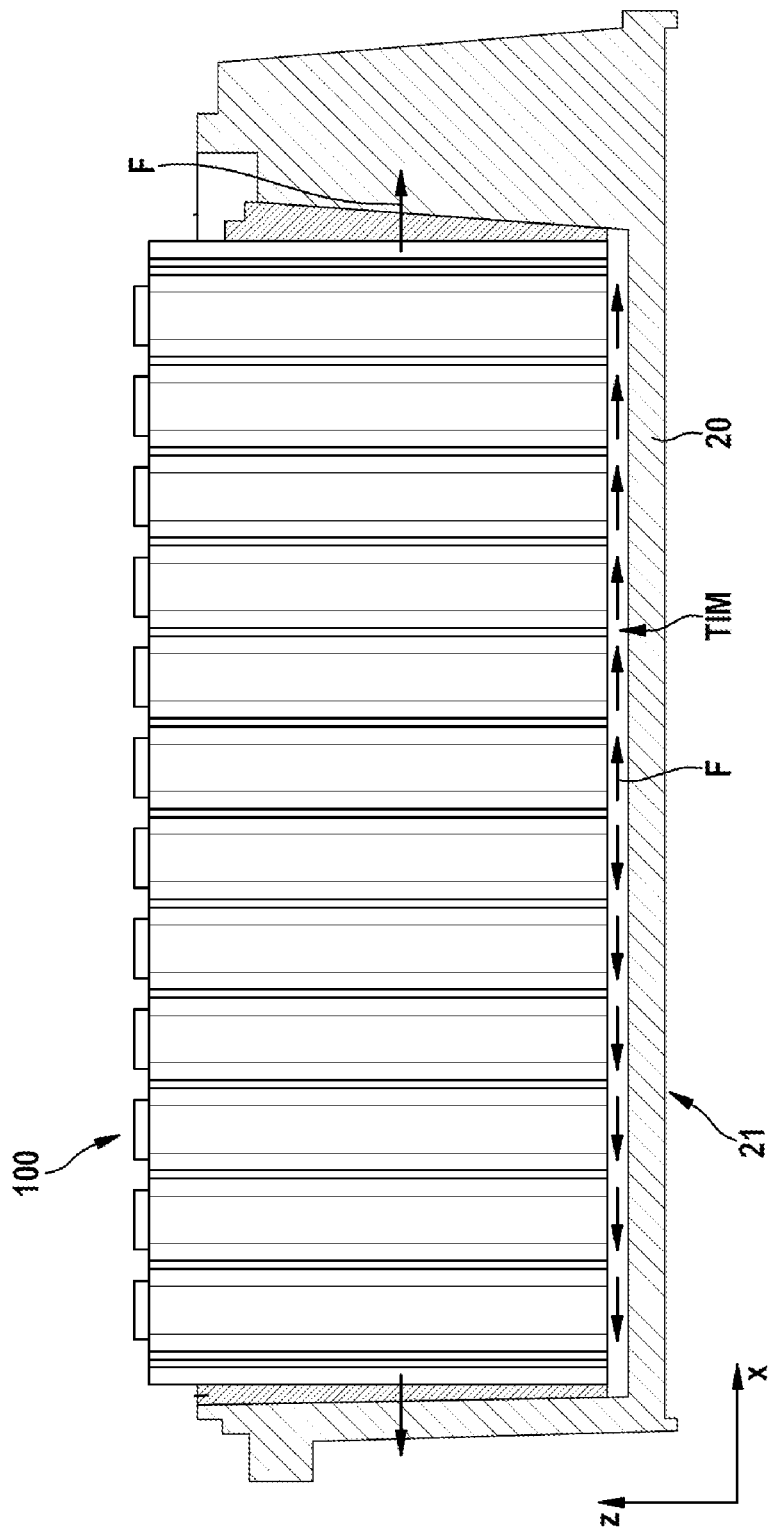
FIG. 3 shows an exemplary illustration of a battery within the scope of the invention, with a housing which is open at the side, in a corresponding side view.
Figure 4:
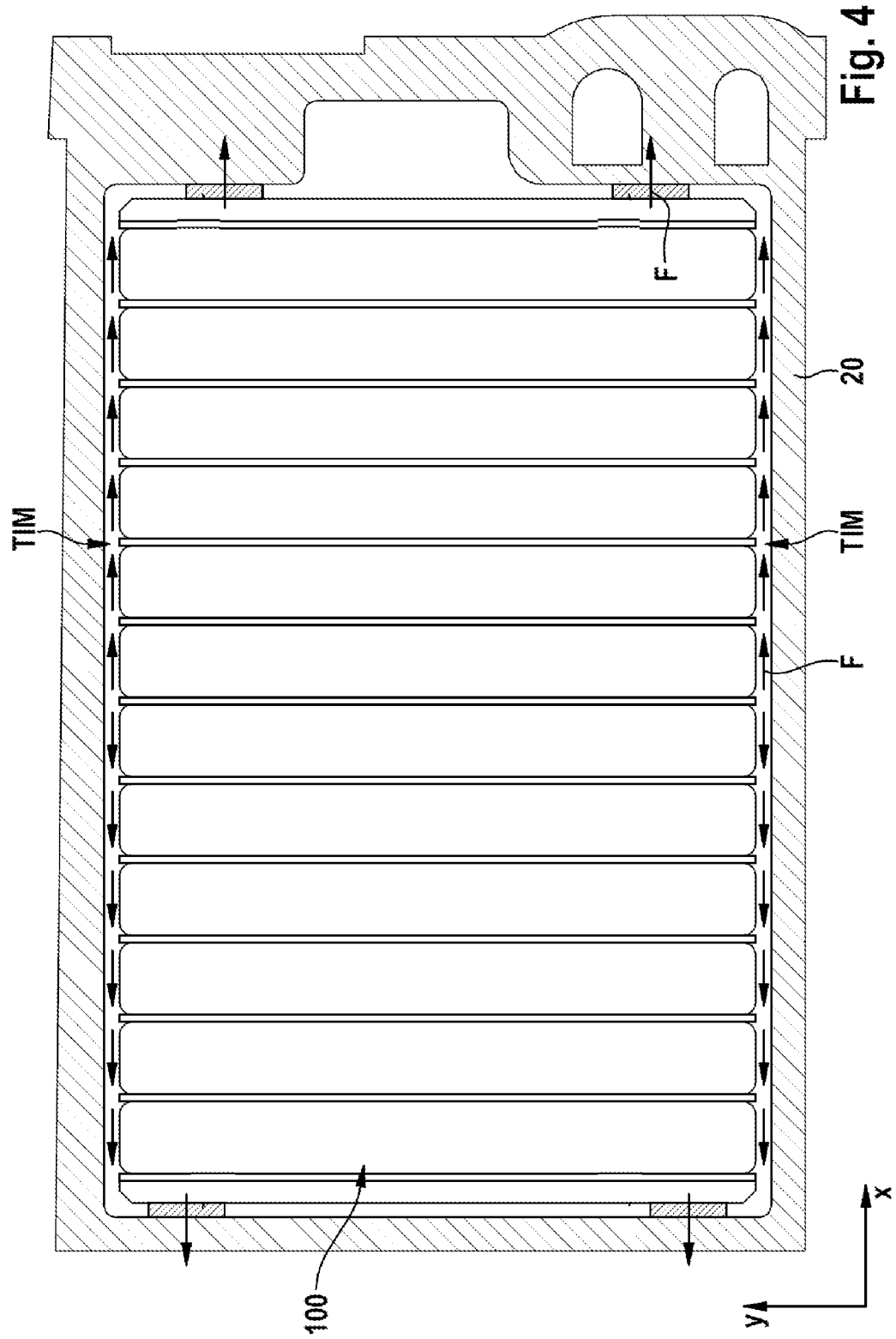
FIG. 4 shows an exemplary illustration of a battery within the scope of the invention, with a housing which is open at the top, in a corresponding plan view.

FIGS. 1 to 4 show a battery 100, in particular a lithium-ion battery, having: a plurality of battery cells 10, which are assembled to form a cell stack (c.f. FIGS. 1 and 2) and are received in a cell housing 20 (c.f. FIGS. 3 and 4). As shown in FIG. 3, the battery cells 10 are bonded to the base 21 of the housing 20 by a heat conductive bonding material TIM. As can be seen in FIGS. 1 and 2, a plurality of spacer elements 11 are provided, wherein a spacer element 11 is arranged in each case between two adjacent battery cells 10. A spacer element 11 can also be optionally provided in each case between the end battery cells 10 and two end plates 22.

The end plates 22 delimit the cell stack at the ends. The end plates 22 are connected by at least one tensioning band 23 and, in particular, braced against one another so that the battery cells 10 are likewise braced between the end plates 22. The at least one tensioning band 23 at least partially surrounds the cell stack circumferentially.

In this case, it is conceivable that at least one tensioning band 23 in each case can be bonded to the side walls of the battery cells 10 on each longitudinal side of the cell stack. In this case, the ends of the tensioning bands 23 at the front and back in the view of FIGS. 1, 2 and 4 can be attached to the end plates 22 with material fit, preferably by welding.

However, it is at the same time also conceivable that a continuous tensioning band 23 can be provided, which can surround the cell stack over the full circumference and/or in the manner of a loop. In this case, the ends of the tensioning band 23 can be attached to one another and preferably to one of the end plates 22 with material fit, for example by welding.

According to the invention, it is provided that the at least one tensioning band 23 is bonded to the side walls of the battery cells 10 by a bonding material.

For the bonding at the side walls of the battery cells, the bonding material can be applied either to the side walls of the battery cells 10 or to the at least one tensioning band 23.

The battery cells 10 are therefore bonded to the at least one tensioning band 23 in addition to the bonding at the base 21 of the cell housing 20. A second load path for transferring the expansion forces F is thus provided within the housing 20. The stress in the heat conductive bonding material TIM in the first load path can thus be significantly reduced and the risk of a breakdown of the heat conductive bonding material TIM can be minimized. The useful life of the bonded connection via the heat conducting bonding material TIM can thus be increased considerably. In this case, the risk of the battery cells 10 no longer being reliably cooled can be reduced considerably. A battery 100 with a longer useful life and increased safety is therefore provided.

Since the stresses in the heat conductive bonding material TIM between the battery cells 10 and the base 21 of the cell housing 20 are reduced, the properties of the heat conductive bonding material TIM—strength to elongation at break—can be set within a greater range. A more cost-effective heat conductive bonding material TIM can therefore be used.

Within the scope of the invention, the bonding material which serves to bond the side walls of the battery cells 10 to the at least one tensioning band 23 can have heat conductive additives. In this way, a second pathway for transferring the heat can be provided via the at least one tensioning band 23. However, it is also essentially conceivable within the scope of the invention that the bonding material can be realized with or without heat conductive additives.

The bonding material which serves to bond the side walls of the battery cells 10 to the at least one tensioning band 23 can be advantageously realized as the same heat conductive bonding material TIM with which the battery cells 10 are bonded to the base 21 of the cell housing 20. There is therefore no need to involve two different bonding materials.

Within the scope of the invention, the minimum layer thickness of the bonding material can be matched to the maximum permissible particle size of the residual dirt requirement in order to ensure the electrical insulation between the battery cells 10 and the at least one tensioning band 23 in the event of contamination.

It is moreover conceivable that the at least one tensioning band 23 can have an electrically insulating coating (not illustrated for the sake of simplicity) for example on the broad sides or upper side and underside of the at least one tensioning band 23 or over the full circumference, which coating can be provided, for example, by means of cathodic dip coating (CDC) or anodic dip coating (ADC), in an anodizing process, as an insulation foil or the like.

As already mentioned above, the at least one tensioning band 23 can be connected to the end plates 22 with material fit. High forces can thus be transferred between the tensioning band 23 and the end plates 22. The at least one tensioning band 23 can preferably be welded to the end plates 22. As shown in FIG. 2, the at least one tensioning band 23 can include a first portion 40 extending along and bonded to side walls of the battery cells 10 by a band bonding material and second portions 42 connected to respective end plates of the two end plates 22.

Figure 5:
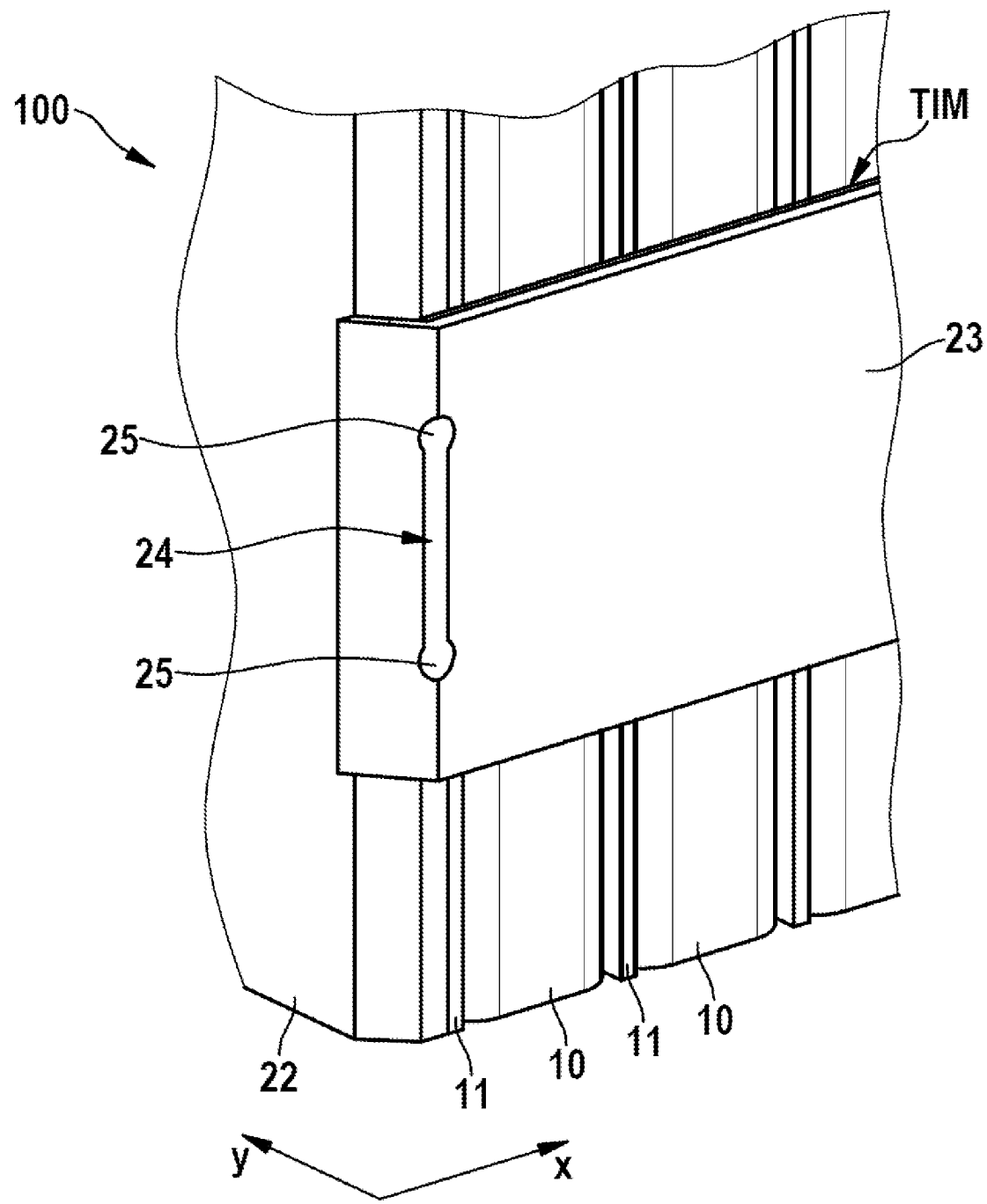
FIG. 5 shows a portion of a tensioning band within the scope of the invention.

With The mechanical load path from the battery cells 10 to the edges of the cell stack is illustrated in FIGS. 3 and 4 (see arrows for the expansion forces F). As a result of the expansion of the battery cells 10 over the useful life of the battery 100, the expansion force F of the compressed battery cells 10 increases in the longitudinal direction x. Direction y extends horizontally away from the direction x as shown in FIGS. 1, 2, and 5. Direction z extends vertically away from the direction x as shown in FIGS. 3 and 4. This expansion force F is, on the one hand, transferred to the adjacent component via the heat conductive bonding material TIM at the base 21 of the housing 20 and is also absorbed by the bracing elements of the cell stack, comprising the end plates 22 and the tensioning bands 23. By bonding the individual battery cells 10 to the at least one tensioning band 23, the longitudinal elongation of the at least one tensioning band 23 is reduced considerably, since its free path is greatly reduced. Consequently, the longitudinal elongation of the cell stack is reduced and the forces on the heat conductive bonding material TIM at the base 21 of the housing 20 are reduced.

As a result of the expansion of the battery cells 10, the end plates 22 can be bent outwards. This bending can bring about a peel strain on the bonding material in the case of the outer two battery cells 10 due to the material fitting connection to the tensioning bands 23, which would otherwise lead to high stresses in the bonding material.

As shown in FIG. 5, the tensioning bands 23 can be provided with slots 24 vertically adjacent to the material fitting connection to the end plates 22. Each slot 24 can include two sidewalls that are spaced apart and that extend parallel to a longitudinal axis of the slot 24. The load transfer can therefore take place via the webs above and below the slots 24, which can be carried out reliably due to the cross-sectional surface and/or the strength of the webs being configured accordingly.

The mechanical stresses in the tensioning bands 23 at the slots 24 can be evened out by rounded portions 25 at both ends of the slot 24. With the aid of slots 24, preferably with rounded portions 25 at the ends, the peel strain on the bonding material can be significantly reduced, which can ensure the reliability of the bonded connection.

The above description of the figures describes the present invention exclusively within the context of examples. It goes without saying that individual features of the embodiments can be combined freely with one another, if technical useful, without departing from the scope of the invention.

What is claimed is:
1. A battery (100) comprising:
a plurality of battery cells (10), which are assembled to form a cell stack and are received in a cell housing (20), wherein the battery cells (10) are bonded to a base (21) of the cell housing (20) by a heat conductive bonding material (TIM),
a plurality of spacer elements (11), wherein a spacer element (11) of the plurality of spacer elements (11) is arranged in each case between two adjacent battery cells (10) of the plurality of battery cells (10), and
two end plates (22), which delimit the cell stack at ends, wherein the end plates (22) are connected by at least one tensioning band (23) that at least partially surrounds the cell stack circumferentially,
wherein the at least one tensioning band (23) includes a first portion extending along and bonded to side walls of the battery cells (10) by a band bonding material, wherein the at least one tensioning band (23) includes a second portion connected to an end plate of the two end plates (22), wherein the at least one tensioning band (23) has a slot (24) formed in a region of connection of the second portion to the end plate (22), the slot (24) including two sidewalls that are spaced apart and that extend parallel to a longitudinal axis of the slot (24), wherein the slot (24) further includes rounded, bulb-shaped portions (25) at opposite ends of the slot, and wherein, perpendicular to the longitudinal axis of the slot, the rounded, bulb-shaped portions (25) extend outside of the two sidewalls and away from the longitudinal axis of the slot (24).

2. The battery (100) according to claim 1, characterized that the band bonding material has heat conductive additives.

3. The battery (100) according to claim 1, characterized in that the band bonding material is the same heat conductive bonding material (TIM) with which the battery cells (10) are bonded to the base (21) of the cell housing (20).

4. The battery (100) according to claim 1, characterized in that the band bonding material has a layer thickness which is greater than a maximum permissible particle size for a residual dirt requirement in the battery (100).

5. The battery (100) according to claim 1, characterized in that the at least one tensioning band (23) has an electrically insulating coating.

6. The battery (100) according to claim 1, characterized in that the at least one tensioning band (23) is connected to the end plates (22) with material fit, or with form fit or with a combination of material fit and form fit.

7. The battery (100) according to claim 1, characterized in that the at least one tensioning band (23) and/or the end plates (22) is/are made from a metal material.

8. The battery (100) according to claim 1, characterized in that battery (100) is a lithium-ion battery.

9. The battery (100) according to claim 1, characterized in that the at least one tensioning band (23) is connected to the end plates (22) by welding, or with form fit or with a combination of welding and form fit.

10. The battery (100) according to claim 1, characterized in that the at least one tensioning band (23) and/or the end plates (22) is/are made from steel, stainless steel, or an aluminum alloy.

11. The battery (100) according to claim 1, wherein the first portion and the second portion meet to form an interior angle facing the plurality of battery cells (10) and an exterior angle facing away from the plurality of battery cells (10), and wherein the longitudinal axis of the slot (24) is aligned with a vertex of the exterior angle such that a width of the slot (24) extends into the first portion and into the second portion.

12. The battery (100) according to claim 1, wherein the slot (24) has a length along the longitudinal axis of the slot, a width oriented at 90 degrees to the length, and a depth oriented at 90 degrees to the length and the width and extending into the at least one tensioning band (23), wherein the length is longer than the width, and wherein the length extends away from the base (21).

13. The battery (100) according to claim 12, wherein the plurality of battery cells (10) and the plurality of spacer elements (11) are stacked along a stacking direction, wherein the at least one tensioning band (23) has a length that extends parallel to the stacking direction, and wherein the length of the slot (24) extends perpendicularly to the stacking direction.

14. The battery (100) according to claim 13, wherein ends of the slot along the length of the slot are spaced away from side edges of the at least one tensioning band (23).

15. The battery (100) according to claim 13, wherein the battery cell is configured such that, as a result of thermal expansion of the plurality of battery cells (10), during use the two end plates (22) are bent outwards causing a peel strain on the bonding material, and wherein the slot (24) is configured such that a load transfer caused by the slot reduces the peel strain on the bonding material to ensure the reliability of a bonded connection between the plurality of battery cells (10) and the at least one tensioning band (23).

16. A battery (100) comprising:

a plurality of battery cells (10), which are assembled to form a cell stack and are received in a cell housing (20), wherein the battery cells (10) are bonded to a base (21) of the cell housing (20) by a heat conductive bonding material (TIM), a plurality of spacer elements (11), wherein a spacer element (11) of the plurality of spacer elements (11) is arranged in each case between two adjacent battery cells (10) of the plurality of battery cells (10), and two end plates (22), which delimit the cell stack at ends, wherein the end plates (22) are connected by at least one tensioning band (23) that at least partially surrounds the cell stack circumferentially, wherein the at least one tensioning band (23) includes a first portion extending along and bonded to side walls of the battery cells (10) by a band bonding material, wherein the at least one tensioning band (23) includes a second portion connected to an end plate of the two end plates (22), wherein the at least one tensioning band (23) has a slot (24) formed in a region of connection of the second portion to the end plate (22), the slot (24) including two sidewalls that are spaced apart and that extend parallel to a longitudinal axis of the slot (24), wherein the slot (24) further includes rounded, bulb-shaped portions (25) at opposite ends of the slot, wherein, perpendicular to the longitudinal axis of the slot, the rounded, bulb-shaped portions (25) extend outside of the two sidewalls and away from the longitudinal axis of the slot (24)

wherein the slot (24) has a length, a width oriented at 90 degrees to the length, and a depth oriented at 90 degrees to the length and the width and extending into the at least one tensioning band (23), wherein the length is longer than the width, wherein the length extends away from the base (21), wherein the plurality of battery cells (10) and the plurality of spacer elements (11) are stacked along a stacking direction, wherein the at least one tensioning band (23) has a length that extends parallel to the stacking direction, wherein the length of the slot (24) extends perpendicularly to the stacking direction, wherein ends of the slot along the length of the slot are spaced away from side edges of the at least one tensioning band (23), wherein the battery cell is configured such that, as a result of thermal expansion of the plurality of battery cells (10), during use the two end plates (22) are bent outwards causing a peel strain on the bonding material, wherein the slot (24) is configured such that a load transfer caused by the slot reduces the peel strain on the bonding material to ensure the reliability of a bonded connection between the plurality of battery cells (10) and the at least one tensioning band (23), wherein the first portion and the second portion meet to form an interior angle facing the plurality of battery cells (10) and an exterior angle facing away from the plurality of battery cells (10), wherein the longitudinal axis of the slot (24) is aligned with a vertex of the exterior angle such that the width of the slot (24) extends into the first portion and into the second portion.

\* \* \* \* \*